United States Patent [19]
Huxtable

[11] Patent Number: 5,178,353
[45] Date of Patent: Jan. 12, 1993

[54] SNAP-ON FIXTURE

[75] Inventor: Paul S. Huxtable, Holden Hill, Australia

[73] Assignee: Caroma Industries Limited, Brisbane, Australia

[21] Appl. No.: 886,308

[22] PCT Filed: Feb. 9, 1990

[86] PCT No.: PCT/AU90/00056
§ 371 Date: Sep. 10, 1991
§ 102(e) Date: Sep. 10, 1991

[87] PCT Pub. No.: WO90/09135
PCT Pub. Date: Aug. 23, 1990

Related U.S. Application Data

[63] Continuation of Ser. No. 761,860, Sep. 10, 1991, abandoned.

[30] Foreign Application Priority Data

Feb. 16, 1989 [AU] Australia .............................. PJ2779

[51] Int. Cl.$^5$ ............................................. A47K 1/00
[52] U.S. Cl. ..................................... 248/222.3; 4/605; 4/628; 403/381
[58] Field of Search ............... 248/222.3, 223.4, 224.4, 248/225.1, 690, 220.2, 225.2, 227, 222.2; 4/628, 605; 403/381

[56] References Cited

U.S. PATENT DOCUMENTS

| | | | |
|---|---|---|---|
| 2,330,591 | 9/1943 | Kendall | 248/223.4 X |
| 2,587,912 | 3/1952 | Simpson | 248/221.3 |
| 3,337,172 | 8/1967 | Jackson | 248/222.2 |
| 4,300,248 | 11/1981 | Dworkin | 4/628 |
| 4,398,691 | 8/1983 | Wilke | 248/235 |
| 4,585,199 | 4/1986 | Chap | 248/220.2 |

FOREIGN PATENT DOCUMENTS

| | | |
|---|---|---|
| 20481/83 | 5/1984 | Australia . |
| 298731 | 5/1972 | Austria . |
| 32723 | 7/1981 | European Pat. Off. . |
| 3431393 | 3/1986 | Fed. Rep. of Germany . |
| 579897 | 9/1976 | Switzerland . |

Primary Examiner—Ramon O. Ramirez
Attorney, Agent, or Firm—Merchant, Gould, Smith, Edell, Welter & Schmidt

[57] ABSTRACT

The present invention discloses a concealed snap-on fixture for load bearing bathroom fittings such as soap holders and bathroom shelves. The fixture is a base plate (1) having upper outwardly curved surfaces (6) and lower downwardly directed ridges (7) which respectively engage corresponding parts (13, 14) in the bathroom fitting (2). The corresponding parts are an upper rearwardly directed curved surface (13) and a lower resiliently deformable protrusion (14).

7 Claims, 3 Drawing Sheets

SNAP-ON FIXTURE

This is a continuation of application Ser. No. 07/761,860, filed Sep. 10, 1991, now abandoned.

TECHNICAL FIELD

The present invention relates to concealed fixtures and, in particular. to a snap-on concealed fixture arrangement for load bearing bathroom fittings.

BACKGROUND ART

Load bearing bathroom fittings such as soap holders, bathroom shelves, towel racks, bath robe hooks, and the like must be secured to a vertical surface of a bathroom. It is highly desirable if the fitting can be arranged with a concealed fixture so that the fasteners used to connect the fitting to the vertical surface cannot be seen. This is particularly advantageous in bathroom fittings because the humid atmosphere of the bathroom often leads to corrosion, or discolouration, of metal fasteners.

It is also preferable if all the parts of the fittings can be moulded from plastics material.

SUMMARY OF THE INVENTION

According to the present invention there is disclosed a snap-on fixture arrangement for a load bearing bathroom fitting, said arrangement comprising a base plate having at least one aperture through which a fastener passes to secure said base plate to a vertical surface of said bathroom, an upper forwardly protruding curved bearing surface spaced apart from, and above, a downwardly directed ridge., and an outer member comprising said fitting, the inner surface of said outer member having an upper rearwardly directed curved surface and a lower resiliently deformable protrusion whereby said outer member can be engaged with said base plate by inter-engagement of said curved surfaces, and said outer member pivoted to move said protrusion downwardly to snap over said ridge.

DESCRIPTION OF THE DRAWINGS

An embodiment of the present invention will now be described with reference to the drawings in which.

DETAILED DESCRIPTION

Figure 1:
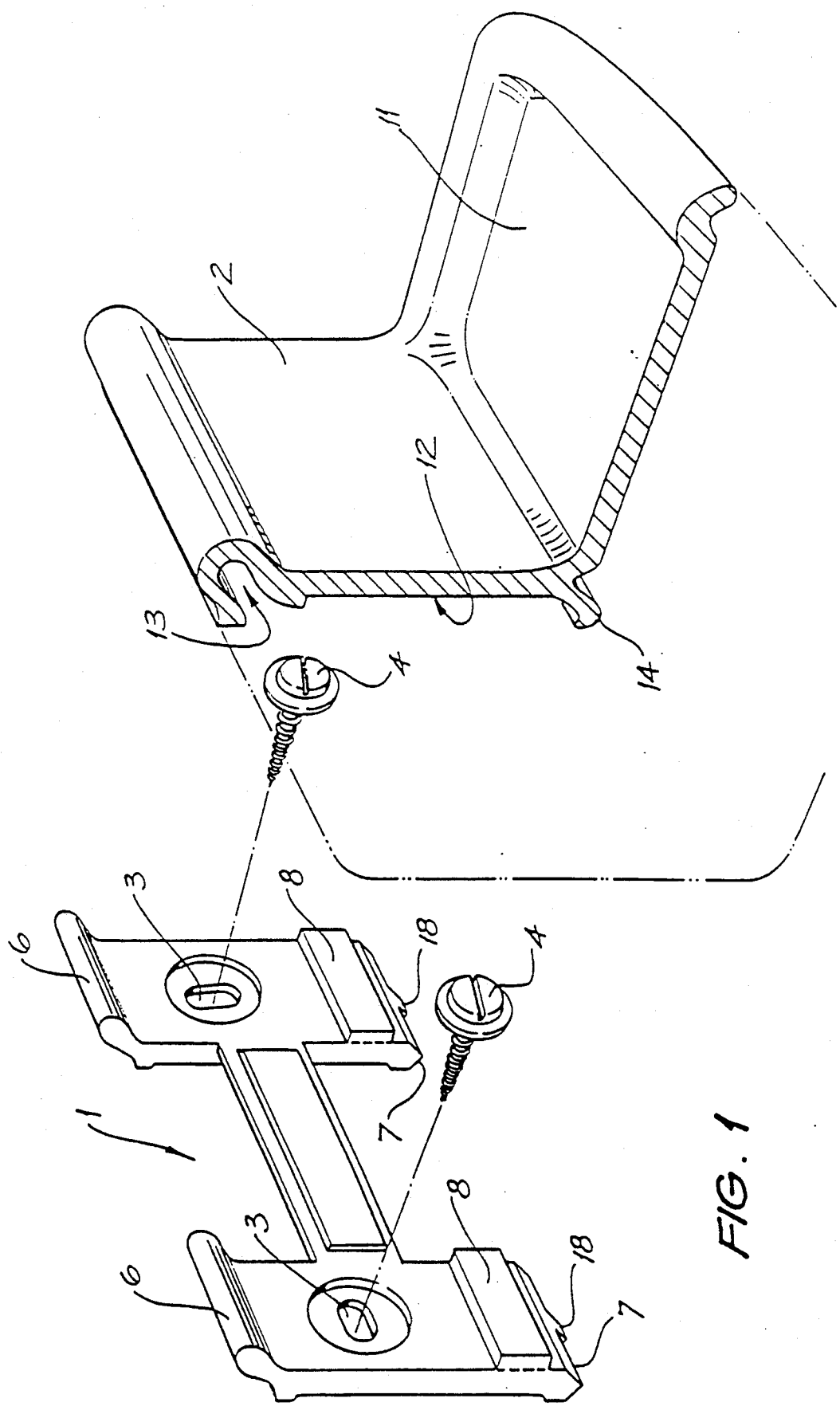
FIG. 1 is an exploded perspective, partly sectional view of a soap holder or shower shelf in accordance with the preferred embodiment of the present invention.

As best seen in FIG. 1, the fitting comprises two parts, a base plate 1 and an outer member 2.

Figure 2:
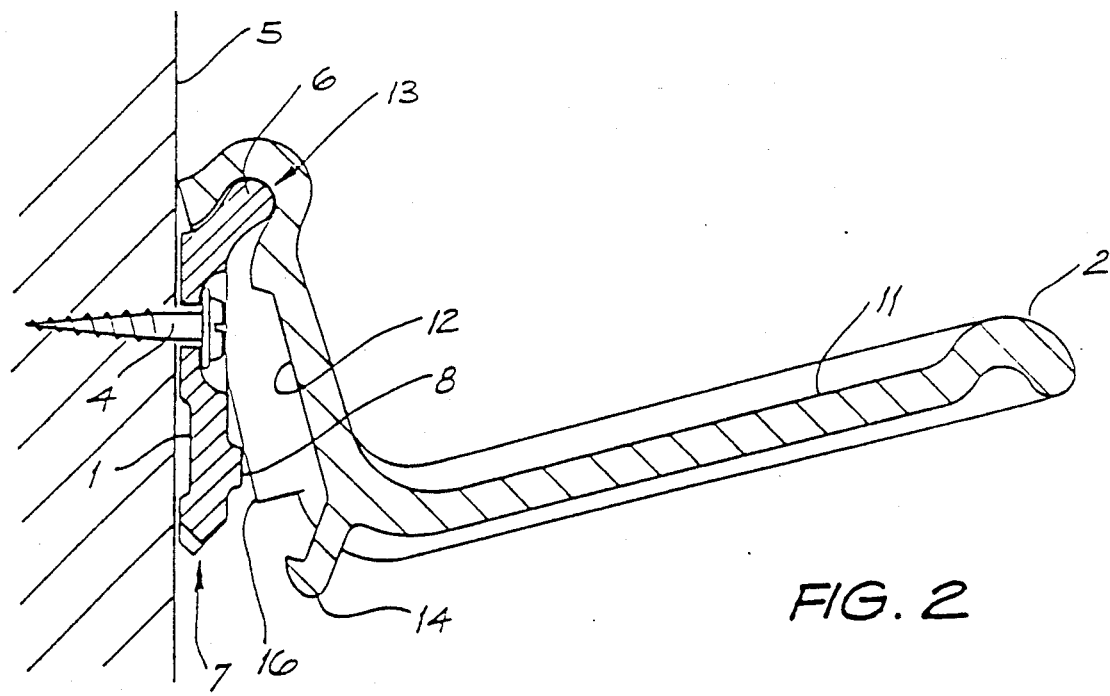
FIG. 2 is a vertical sectional view during installation.
Figure 3:
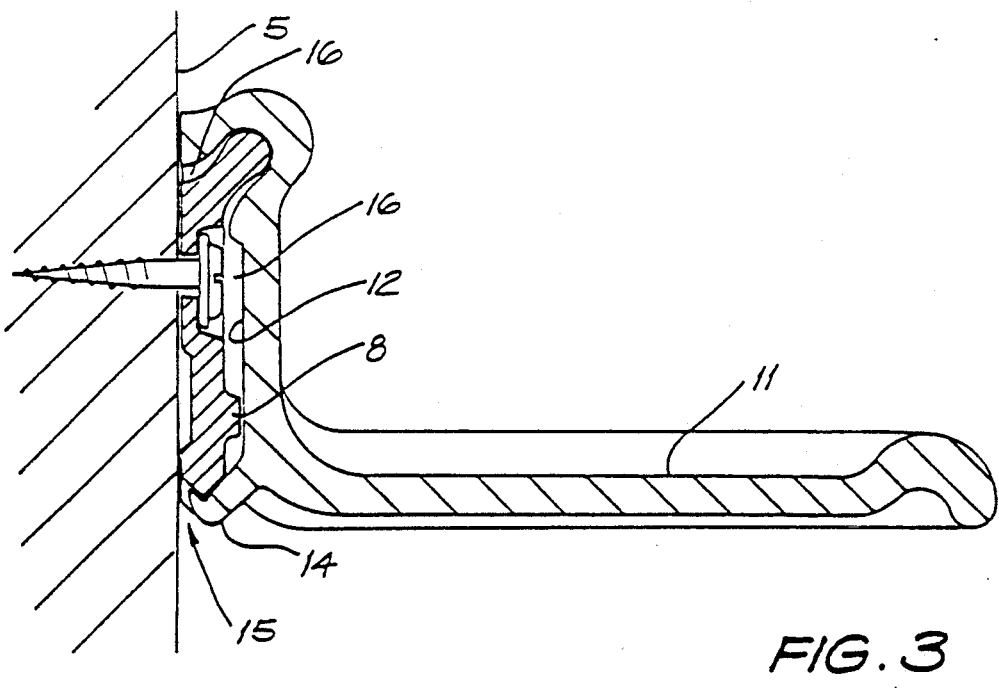
FIG. 3 is a vertical sectional view of the assembled fitting.

The base plate 1 has a pair of spaced apart apertures 3 arranged to each receive one of a corresponding pair of fasteners 4 by which means the base plate 1 can be secured to a vertical surface 5 (FIGS. 2 and 3).

The base plate 1 is provided with two forwardly protruding curved bearing surfaces 6 as its upper extremities and two downwardly directed ridges 7 as its lower extremities. Preferably located intermediate the curved surfaces 6 and ridges 7 are a pair of load bearing bosses 8 which are generally rectangular in shape. However, as indicated by broken lines in FIG. 1 the bosses B can be deleted or be of reduced height if desired.

The outer member 2 is provided with a shelf 11 which extends outwardly and an inner surface 12 which faces towards the base plate 1 as best seen in FIG. 2. Along its upper edge, the outer member 2 is provided with a recess 13 having a rearwardly directed curved surface whilst along the lower edge of the outer member 2 there is provided a hook-shaped protrusion 14.

As best illustrated in FIG. 2, the base plate 1 s first secured to the vertical surface 5. Then the recess 13 is engaged with the curved surfaces 6 whilst the shelf 11 is inclined upwardly above the horizontal. Then the outer member 2 is pivoted in a clock-wise direction as viewed in FIG. 2 so as to engage the protrusion 14 over the ridges 7. This is the position illustrated in FIG. 3.

It will be appreciated by those skilled in the art that in the engaged position illustrated in FIG. 3, the bosses B can be dimensioned to bear on the inner surface 12 and thereby provide additional support to counteract any torque created by objects placed on the shelf 11.

Furthermore, as best seen in FIG. 2, the side edges 16 (only one of which is illustrated in FIG. 2}of the outer member 2 extend rearwardly of the inner surface 12. Thus the side edges 16 cover the base plate 2 from view when viewed in the direction opposite to FIGS. 2 and 3 thereby providing for a completely concealed fixture.

Figure 4:
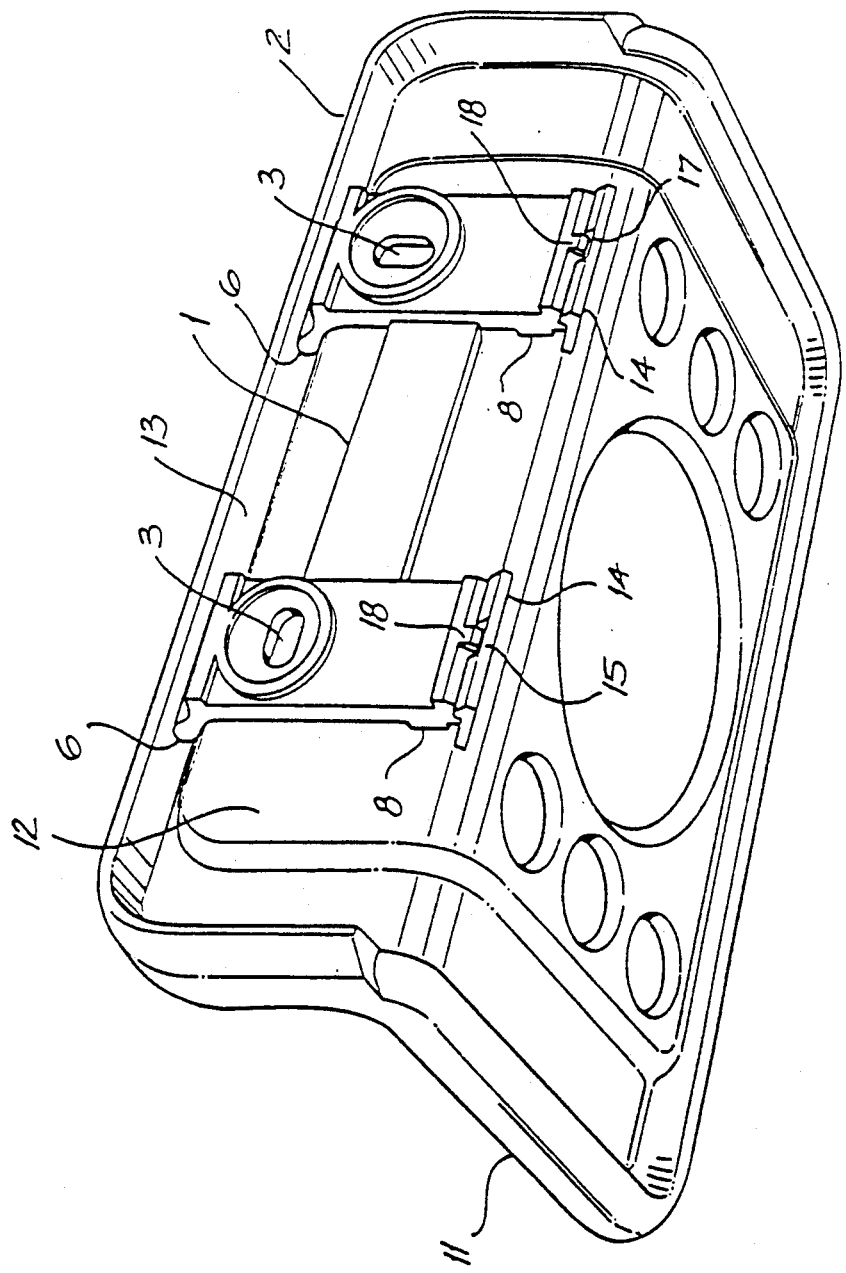
FIG. 4 is a rear perspective view of the two inter-engaged parts.

As best illustrated in FIGS. 3 and 4, a small gap 15 is provided between the vertical surface 5 and protrusion 14 into which a screwdriver, or like device, can be inserted in order to disengage the protrusion 14 and ridges 7. This enables the fixture to be detached from the vertical surface 5 if desired. The gap 15 is ordinarily hidden from view by the shelf 11 and protrusion 14.

As seen in FIG. 4, in addition to the gap 15, one of the protrusions 14 is provided with a narrow locating slot 17 which mates with the corresponding one of a small lug 18 provided on each the ridges 7. It will be apparent to those skilled in the art that since the ridges 7 and protrusions 14 are provided with the same profile, after engagement of the plate 1 and outer member 2, some mechanism should be provided to prevent the possibility of the outer member sliding horizontally (i.e. into and out of the page as illustrated in FIG. 3) This mechanism preferably takes the form of the positioning of the lug 18 in the locating slot 17.

The foregoing describes only one embodiment of the present invention and modifications, obvious to those skilled in the art, can be made thereto without departing from the scope of the present invention.

I claim:

1. A snap-on fixture arrangement for a load bearing bathroom fitting, said arrangement comprising a base plate having at least one aperture through which a fastener passes to secure said base plate to a vertical surface of said bathroom, and an upper forwardly protruding curved bearing surface spaced apart from, and above, a downwardly directed ridge; and an outer member comprising said fitting, the inner surface of said outer member having an upper rearwardly directed curved surface and a lower resiliently deformable protrusion whereby said outer member can be engaged with said base plate by inter-engagement of said curved surfaces and said outer member pivoted to move said protrusion downwardly to snap over said ridge.

2. A fixture arrangement as claimed in claim 1 wherein said base plate is generally H-shaped in configuration, each upright of said H having said forwardly protruding curved bearing surface at its upper end and said downwardly directed ridge at its lower end and said outer member is provided with a pair of said upper rearwardly directed curved surfaces and a pair of said lower protrusions.

3. A fixture as claimed in claim 3 wherein one of said ridge is provided with a downwardly directed lug.

4. A fixture as claimed in claim 3 wherein one of said lower protrusions is provided with a locating slot to receive said lug.

5. A fixture as claimed in claim 1 wherein said base plate is provided with a forwardly protruding load bearing boss located between said upper curved bearing surface and said downwardly directed ridge, said boss being dimensioned to bear of the inner surface of said outer member with said ridge and protrusion engaged.

6. A fixture as claimed in claim 1 wherein said outer member has a peripheral side edge which abuts said bathroom vertical surface with said ridge and protrusion engaged to thereby substantially conceal said base plate from view.

7. A fixture as claimed in claim 1 wherein the or each protrusion is dimensioned to form a gap between said protrusion and said bathroom vertcal surface with said ridge and protrusion engaged.

* * * * *

UNITED STATES PATENT AND TRADEMARK OFFICE
CERTIFICATE OF CORRECTION

PATENT NO. : 5,178,353

DATED : January 12, 1993

INVENTOR(S) : Paul S. Huxtable

It is certified that error appears in the above-identified patent and that said Letters Patent is hereby corrected as shown below:

Column 1, line 33, "ridge., should read --ridge;--

Column 2, line 10, "s" should read --is--.

Column 2, lines 1 and 18, "B" should read --8--.

Column 3, line 6, "3" should read --2--.

Column 3, line 6, after the word "wherein" insert --at least--.

Signed and Sealed this

Twenty-fifth Day of January, 1994

Attest:

BRUCE LEHMAN

Attesting Officer     Commissioner of Patents and Trademarks